United States Patent Office 2,864,813
Patented Dec. 16, 1958

2,864,813
WATER SOLUBLE COLOUR SALTS

Werner Bossard, Riehen near Basel, and Jacques Voltz and François Favre, Basel, Switzerland, assignors to J. R. Geigy, A.-G., Basel, Switzerland, a Swiss firm No Drawing. Application January 23, 1956
Serial No. 560,872

Claims priority, application Switzerland January 28, 1955

8 Claims. (Cl. 260—146)

The invention concerns water soluble colour salts which contain an azo dyestuff as cation and processes for the production thereof from azo dyestuffs which are insoluble in water and which contain a pyridine ring.

It has been found that stable water soluble colour salts which contain the azo dyestuff as cation are obtained if an azo dyestuff, having no acid dissociating, salt forming groups, of the general formula:

$$A-N=N-B$$

wherein A represents a mono or poly nuclear pyridine ring system which is bound to the azo group by a carbon atom of the pyridine ring, and wherein B represents the radical of an azo component which may be modified in the dyestuff molecule, is reacted at a raised temperature with suitable alkylating agents.

The pyridine ring in A, can be fused with a benzene ring to form a quinoline ring and these ring systems can be further substituted as desired within the bounds of the definition, e. g. by alkyl, alkoxy, aralkyl, aryl, nitro, acylamino, carboxylic acid ester groups or by halogen. B can represent the radical of a coupling component further substituted as desired within the bounds of the definition, in particular in the azo dyestuffs derived from 3-amino pyridine. However, the term azo component should not have a limited meaning in the sense that only dyestuffs produced by azo coupling should be used. Rather, the dyestuffs according to the present invention can be produced by any method desired. Thus for example, 2-arylazo pyridine and quinoline compounds which produce particularly valuable colour salts according to the present invention by condensation of the corresponding 2-amino pyridine and quinoline compounds with nitroso aryl compounds, can be used. In particular the p-aminophenyl azo pyridine and quinoline dyestuffs produce very valuable colour salts according to the present invention which can be obtained according to this method by using p-nitroso dialkyl anilines, p-nitroso diphenylamines or p-nitroso benzyl alkyl anilines. If dyestuffs produced by azo coupling are used, then B for example, can represent the radical of an acyl acetic acid arylamide, an o- or p-hydroxyaryl or an o- or p-amino aryl radical, a 3-indolyl radical, a 5-hydroxy or 5-amino pyrazole radical.

In the preferred p-aminoaryl azo dyestuffs, the amino group can be primary, secondary or tertiary. The substituents of the amino group can be aliphatic, araliphatic, alicyclic, aromatic or heterocyclic. They can be further substituted, as in the oxalkyl, fluoralkyl, cyanalkyl, alkoxy and phenyl alkyl, the alkylphenyl, alkoxyphenyl, halogen phenyl and the alkylbenzyl, halogen benzyl and alkoxybenzyl compounds. Aliphatic substituents of the amino group can also form hydrogenated rings either among themselves or with an ether atom or with the aromatic radical having an amino group as in the piperidino, the morpholino, the 1.2.3.4-tetrahydroquinoline, the lilolidine, julolidine, and perimidine compounds. The preferred p-aminophenyl radical in the azo dyestuffs usable according to the present invention can be further substituted as desired within the bounds of the definition, for example by halogen, alkyl, alkoxy, nitro, acylamino, alkyl sulphonyl groups. Monoazo dyestuffs are to be preferred to polyazo dyestuffs.

Alkylating agents suitable for the production of colour salts according to the present invention are the esters of strong mineral acids and organic sulphonic acids of, preferably, low alcohols. Chiefly alkyl chlorides, alkyl bromides, alkyl iodides, aralkyl halides, dialkyl sulphates, alkyl benzene sulphates, alkyl-p-methylbenzene sulphates, alkyl-p-halogen benzene sulphates and possibly alkyl nitrobenzene sulphates are used. For example the methyl, ethyl, methoxy or ethoxy ethyl, n-propyl, n-butyl esters or the halogen hydrines of divalent or trivalent alcohols with 2 to 4 carbon atoms can be used.

The monoazo dyestuffs usable according to the present invention are reacted with suitable alkylating agents advantageously in inert organic solution, the colour salts formed often precipitating and being isolated by filtration. Liquid aliphatic, cyclo-aliphatic or aromatic hydrocarbons can be used as inert organic solvents, also stable aliphatic or cyclic halogen compounds such as e. g. carbon tetrachloride, tetrachlorethylene, chlorobenzene, dichlorobenzenes or nitrobenzene. If too energetic reaction conditions are avoided the reaction can also be performed in an excess of liquid alkylating agent. The reaction of the azo dyestuffs which are insoluble in water with the alkylating agent is exothermic and generally on the formation of the cyclammonium salt there is a strongly bathochromic change in colour. However, heating of the components to introduce the reaction is almost always necessary, in particular when the reaction is performed in the presence of inert organic diluents. Advantageously an excess of alkylating agent is used. Under energetic reaction conditions any non-tertiary amino groups present in the starting dyestuff can be alkylated, but as far as the action of the alkylating agent is concerned, the formation of the cyclammonium salt is the preferred and primary reaction. In some favourable cases the cyclammonium salts can be formed also in alcoholic solution and even in aqueous dispersion in the presence of capillary active non-ionogenic or anion active wetting and dispersing agents. Due to the good stability of the colour salts according to the present invention, the solvents can also be removed by distilling off, possibly under reduced pressure or by steam distillation. Also colour salts according to the present invention can be obtained from organic solvents which are not miscible with water by extraction with water. The colour salts according to the present invention are purified advantageously by dissolving in water, any starting dyestuff present not going into solution. The aqueous solutions are treated with solid adsorbents such as charcoal to remove oily impurities and the colour salt is isolated by salting out. The presence of acid hydrogen halide salts of metals of the second sub-group of the periodic system of chemical elements such as zinc chloride or cadmium chloride, is an advantage.

The colour salts according to the present invention correspond to the general formula:

$$[A'-N=N-B] \oplus X \ominus$$

In this formula: A' represents a mono or poly nuclear N-alkyl pyridinium ring system which is bound to the azo group by a carbon atom of the pyridine ring, B represents the radical of any azo component desired, including the radicals of coupling components which, after the coupling, are further modified, and $X\ominus$ represents the anion equivalent to the cation, the coloured cation not containing any acid dissociating, salt forming groups such as sulphonic acid or carboxyl groups.

Preferably A' represents an N-alkyl pyridinium or N-alkyl quinolinium ring bound in the 2-position to the azo group; B represents a p-aminophenyl radical wherein the amino group can be primary, secondary or tertiary; and $X^{\ominus}$ represents a halogen ion or an inorganic or organic anion derived from an acid of hexavalent sulphur. The N-alkyl group of the pyridinium ring can be further substituted, e. g. by phenyl, alkylphenyl, halogen phenyl, or alkoxyphenyl groups in aralkyl substituents or by the hydroxyl group in oxalkyl substituents. $X^{\ominus}$ is generally the anion of a strong acid, e. g. a chlorine, bromine or iodine ion, a metho or etho sulphate ion, a sulphate or bisulphate ion, a benzene, halogen benzene or alkyl benzene sulphonic acid ion. However, the strongly basic, coloured cations also form stable salts with weaker acids so that also the radicals of organic acids can be used, e. g. the anions of acetic acid, formic acid, oxalic acid, lactic acid, tartaric acid; some of the bases themselves are even stable, so that $X^{\ominus}$ may also represent the hydroxyl ion. Often double salts of the colour salts according to the present invention can be produced with advantage with certain inorganic metal salts and used, in particular the zinc chloride double salts. Thus also more complex anions, for example the chlorozincate or chlorocadmiate ion can be used as the anion $X^{\ominus}$ equivalent to the coloured cation.

As can be seen, the uncoloured anion plays a secondary role. The dyestuff character is determined by the coloured cation. Thus the colour salts according to the present invention can be termed basic dyestuffs. Only, it is favourable for the water solubility, if $X^{\ominus}$ represents one of the anions of stronger acids first listed above. Compounds with less good water solubility can generally be dissolved easily by the addition of acids.

In aqueous solution, the dyestuffs according to the present invention dye cellulose fibres mordanted with tartar emetic and tannin, silk, leather and polymeric synthetic fibres containing nitrogen which consist of polyacrylonitrile or are made chiefly from acrylonitrile, for example by mixed polymerisation, generally in very pure shades. The dyeings attained with the dyestuffs according to the present invention are often distinguished by very good fastness to light.

The following examples serve to illustrate the invention. The parts are given as parts by weight and the temperatures are in degrees centigrade. The relationship of parts by weight to parts by volume is as that of kilogrammes to litres.

EXAMPLE 1

A solution of 9.4 parts of 2-amino pyridine in 300 parts of abs. toluene is boiled under reflux for 30 minutes in a nitrogen atmosphere with 4 parts of finely pulverised sodium amide. 15 parts of freshly prepared 1-N.N-dimethylamino-4-nitroso benzene are added to the suspension of the sodium salt of 2-amino pyridine so obtained and the reaction solution is boiled for another 3 hours under reflux (see Brown, J. A. C. S. 73, 4608 (1951)). The reaction mixture is evaporated to dryness in the vacuum and extracted warm with 25% acetic acid. While cooling, the acetic acid extract is carefully neutralised with concentrated lye and the precipitated dyestuff is filtered off.

A solution of 2.3 parts of this dyestuff in 100 parts of tetrachlorethane is reacted at boiling temperature for 1 hour with 3.9 parts of dimethyl sulphate in 10 parts of tetrachlorethane. The dyestuff which precipitates on cooling, is then filtered off.

The violet dyestuff obtained is dissolved in 200 parts of hot water and again precipitated with 1.5 parts of zinc chloride and sodium chloride from the solution which has been clarified with a little charcoal. The dyestuff dissolves in concentrated sulphuric acid with a yellow and in water with a violet colour. It dyes polyacrylonitrile fibres, mordanted cotton and silk from an acetic acid bath in violet shades which have good general fastness properties.

If, instead of 1-N.N-dimethylamino-4-nitroso benzene, the nitroso compounds listed in Table 1 are used, then similar products are obtained.

Table 1

| Nitroso compound | Dyestuff, parts | Solvent, parts | Alkylating agent | Dyeing on polyacrylonitrile fibres |
|---|---|---|---|---|
| 1-N.N-diethylamino 4-nitrosobenzene. | 2.5 | 100 | 2.2 pts. p-toluene sulphonic acid methyl ester. | Violet. |
| 1-N-ethyl-N-benzyl-amino-4-nitroso-benzene. | 3.2 | 150 | 3 pts. dimethyl sulphate. | Do. |

All the products obtained according to the above table dissolve in water with a violet and in concentrated sulphuric acid with a yellow colour.

Instead of 2-amino pyridine, also homologues thereof can be used such as 6-methyl-2-amino pyridine or 4-methyl-2-amino pyridine, and keeping to the above conditions, water soluble colour salts are obtained which dye polyacrylonitrile fibres, mordanted cotton and silk in vivid violet shades. They dissolve in water with a violet and in concentrated sulphuric acid with a yellow colour.

EXAMPLE 2

7.2 parts of 2-amino quinoline are condensed in the presence of 2 parts of sodium amide in toluene as solvent with 7.5 parts of 1-N.N-dimethylamino-4-nitrosobenzene in a manner analogous to that described in example 1. 2.9 parts of the dried azo dyestuff in 100 parts of toluene are then methylated at 120° with 1.8 parts of dimethyl sulphate in 10 parts of toluene. After cooling the reaction mass, the reaction product is filtered off and taken up in 200 parts of hot water, the violet solution is filtered and the colour salt is precipitated, on the addition of 1.5 parts of zinc chloride, with sodium chloride in the form of the zinc chloride double salt. The dyestuff dissolves in water with a violet and in concentrated sulphuric acid with a yellow colour.

From an acetic acid bath, it dyes polyacrylonitrile fibres and silk in violet shades which have excellent fastness properties. Water soluble dyestuffs with similar properties are obtained by using the nitroso compounds listed in Table 2. Also instead of 2-amino quinoline, homologues thereof such as 2-amino-8-methyl quinoline or 2-amino-4-methyl quinoline can be used. The colour salts so obtained dye polyacrylonitrile fibres, mordanted cotton, silk and leather in vivid violet shades. In water they dissolve with a violet and in concentrated sulphuric acid with a yellow colour.

Table 2

| Nitroso compound | Dyestuff, parts | Solvent, parts | Alkylating agent | Dyeing on polyacrylonitrile fibres |
|---|---|---|---|---|
| 1-N.N-diethylamino-4-nitrosobenzene. | 3.04 | 150 | 2.2 pts. p-toluene sulphonic acid methyl ester. | Violet. |
| 1-N-ethyl-N-benzyl-amino-4-nitroso-benzene. | 3.7 | 150 | 3 pts. dimethyl sulphate. | Do. |

All the products obtained according to the above table dissolve in water with a violet and in concentrated sulphuric acid with a yellow colour.

EXAMPLE 3

Following the example of Tschitschibabin (Chem. Zentralblatt 1916, II, 228 and Chem. Zentralblatt 1923, III, 1021), 7 parts of the sodium diazotate of 2-amino pyridine in 50 parts of abs. alcohol are coupled while introducing carbon dioxide with 7 parts of α-naphthol. The coupling solution is poured into ice water and the dyestuff which precipitates is purified by way of the sodium salt.

2.4 parts of p-toluene sulphonic acid ethyl ester in 50 parts of toluene are added to a solution of 2.5 parts of this dyestuff in 150 parts of toluene, the addition being made within 5 minutes at 120°, and the reaction mixture is kept for another 45 minutes at 120°. The dyestuff which precipitates after cooling, is filtered off, taken up in 200 parts of warm water, the solution is clarified with a little charcoal and then the colour salt is precipitated with sodium chloride. The dyestuff dissolves in concentrated sulphuric acid with a red brown and in water with a yellow brown colour. Polyacrylonitrile fibres, mordanted cotton, and silk are dyed from an acetic acid bath in orange shades which have good fastness properties. A similar dyestuff is obtained if β-naphthol is used as coupling component and the amounts of substances given in the above example are used and conditions described therein are kept.

EXAMPLE 4

9.4 parts of 4-amino pyridine are condensed with 15 parts of 1-N.N-dimethylamino-4-nitroso benzene in exactly the same manner as described in Example 1 and the pyridyl-4-azo dyestuff obtained is methylated as described in the above examples. A water soluble violet colour salt is obtained; it dissolves in concentrated sulphuric acid with a yellow colour. From a neutral bath, it dyes silk, mordanted cotton and polyacrylonitrile fibres in violet shades. Similar dyestuffs are obtained if other nitroso compounds such as 1-N.N-diethylamino-4-nitroso or 1-N-ethyl-N-benzylamino-4-nitroso benzene are used. These colour salts dye silk, mordanted cotton and polyacrylonitrile fibres also in vivid violet shades.

EXAMPLE 5

4.7 parts of 3-amino pyridine are dissolved in 50 parts of water and 17 parts of concentrated hydrochloric acid and diazotised under ice cooling with 50 parts of N-nitrite solution and then coupled in an acid medium with 6.0 parts of dimethyl aniline. After buffering the reaction solution with sodium acetate, the precipitated dyestuff is filtered off, washed with a lot of water and dried in the vacuum. 2.3 parts of this monoazo dyestuff are dissolved in 200 parts of chlorobenzene and methylated at 120° with 1.4 parts of dimethyl sulphate in 20 parts of chlorobenzene. The colour salt which precipitates is further worked up as described in Example 2. It dyes mordanted cotton, silk and polyacrylonitrile fibres in red shades which have good general fastness properties.

Also other solvents such as toluene, chloroform or tetrachlorethane can be used for the alkylation instead of chlorobenzene.

Products with similar properties are obtained if the monoazo dyestuffs obtained from 3-amino pyridine and the coupling components listed in Table 3 below are used.

What we claim is:

1. A dyestuff of the general formula:

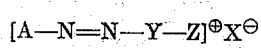

the cation part of which is free from acid salt forming groups and wherein A represents an N-alkyl pyridinium hetero ring system which is bound to the azo group by a C-atom that forms part of said pyridinium ring, Y represents a p-arylene radical, Z represents an amino group, and X⊖ represents an anion.

2. A dyestuff of the general formula:

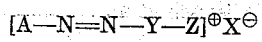

the cation part of which is free from acid salt forming groups and wherein A represents an N-alkyl pyridinium hetero ring system which is bound to the azo group by a C-atom that forms part of said pyridinium ring, Y represents a p-phenylene radical, Z represents an amino group, and X⊖ represents an anion.

3. A dyestuff of the general formula:

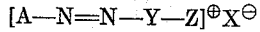

the cation part of which is free from acid salt forming groups and wherein A represents an N-alkyl pyridinium ring which is bound to the azo group by a C-atom that forms part of said pyridinium ring, Y represents a p-phenylene radical, Z represents an amino group, and X⊖ represents an anion.

4. A dyestuff of the general formula:

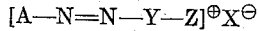

the cation part of which is free from acid salt forming groups and wherein A represents an N-alkyl quinolinium ring which is bound to the azo group in the 2-position of the hetero ring, Y represents a p-phenylene radical, Z represents an amino group, and X⊖ represents an anion.

5. A dyestuff of the formula:

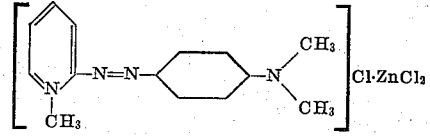

6. A dyestuff of the formula:

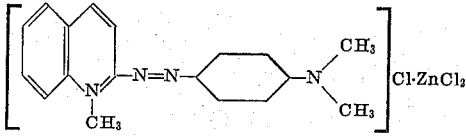

7. A dyestuff of the formula:

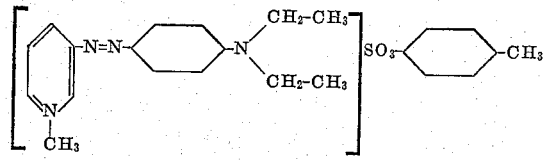

Table 3

| Coupling component | Dyestuff, parts | Solvent, parts | Alkylating agent | Solution colour in— | | Dyeing on polyacrylonitrile fibres |
|---|---|---|---|---|---|---|
| | | | | H₂O | H₂SO₄ conc. | |
| N.N-diethylaminobenzene | 2.54 | 200 | 1.4 pts. dimethyl sulphate | Red | Yellow | Red. |
| N-ethyl-N-benzylaminobenzene | 3.16 | 250 | do | do | do | Do. |
| Phenol | 1.9 | 200 | 2 pts. p-toluene sulphonic acid methyl ester | Yellow | Orange | Yellow. |
| α-Naphthol | 2.5 | 600 | 1.7 pts. diethyl sulphate | do | do | Do. |
| 1-amino-3-methylbenzene | 2.1 | 200 | 2 pts. p-toluene sulphonic acid methyl ester | Red orange | Yellow | Brownish orange. |
| 3-hydroxy-5.6-naphtho-1.2.3.4-tetrahydro pyridine | 3.1 | 250 | 1.7 pts. diethyl sulphate | Red | do | Red. |

8. A dyestuff of the formula:
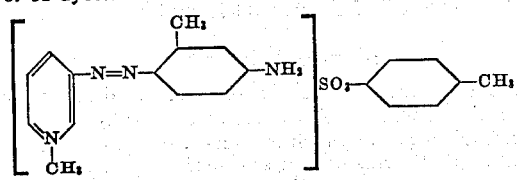
References Cited in the file of this patent
UNITED STATES PATENTS
2,022,921 Mietzsch et al. -------- Dec. 3, 1935
2,135,293 Renshaw et al. -------- Nov. 1, 1938
2,283,220 McNally et al. -------- May 19, 1942
2,294,380 Braker -------- Sept. 1, 1942
2,744,105 Barney -------- May 1, 1956
OTHER REFERENCES
Saunders: The Aromatic Diazo Compounds (2nd ed.), 1949, pp. 78–9.